Patented Sept. 26, 1939

2,174,508

UNITED STATES PATENT OFFICE 2,174,508

PROCESS OF REACTING ISO-ALKANES WITH SULPHUR DIOXIDE AND CHLORINE AND PRODUCTS THEREOF

Arthur L. Fox, Woodstown, N. J., assignor to E. I. du Pont de Nemours & Company, Wilmington, Del., a corporation of Delaware No Drawing. Application June 30, 1938, Serial No. 216,841

17 Claims. (Cl. 260—513)

This invention relates to the manufacture of new surface active compounds and compositions from iso-alkanes. More particularly it relates to the preparation of such materials by passing a gaseous mixture of sulphur dioxide and chlorine through iso-alkanes which are normally liquids or easily liquefiable solids, and hydrolyzing the resulting product.

This invention has for an object the preparation of improved surface active compounds and compositions. A further object is the preparation of new and useful soap-substitutes. A still further object is the preparation of surface active agents which may be incorporated with soap or soap-substitutes. A still further object is the preparation of surface-active agents which are soluble in concentrated solutions of electrolytes. Another object is to prepare surface-active agents from iso-alkanes and cheap reactant materials. Another object is to prepare surface-active agents in an economical manner involving a few procedural steps and simple apparatus. Still other objects will appear hereinafter.

The above and other objects are accomplished by solubilizing iso-alkanes by subjecting them to the action of a gaseous mixture of sulphur dioxide and chlorine, and then hydrolyzing the resultant product.

The carrying out of the process may be exemplified in terms of the following procedure. Gaseous sulphur dioxide and chlorine are mixed in such amounts that there is an excess of the former, preferably about 1.5 to 6 mols of sulphur dioxide to one mol of chlorine and passed into the liquid iso-alkane or mixtures of iso-alkane. The reaction zone is preferably well illuminated with natural or artificial light. Catalysts may be used alone or in conjunction with actinic light. The gaseous mixture should be thoroughly distributed throughout the reaction zone or mixture by a suitable device such as a porous diaphragm or a gas distributing stirrer. The two gases may be separately led into the vessel and then mixed.

Soon after the introduction of the gases begins, the temperature begins to rise. Shortly the temperature will have risen to about 55–57° C., the temperature depending on the rate at which the gases are introduced. When the flow of gases is very fast, external cooling of the reaction mixture may be availed of. Vaporized iso-alkanes are returned to the reaction vessel by a reflux condenser, and the exit gases may be passed through a trap maintained at about −5° C. Any iso-alkanes which pass through the reflux condenser will be condensed by this trap and may be returned to the reaction mixture.

When a sufficient amount of the gases has been introduced, the reaction is stopped and useful products may be recovered from the reaction mixture or the latter may be used for the preparation of derivatives. After the reaction has been stopped dry nitrogen may be bubbled through the reaction mixture to remove dissolved chlorine, sulphur dioxide and hydrogen chloride.

The invention will be further illustrated but is not intended to be limited by the following examples in which the parts stated are parts by weight:

Example I

Through 300 parts of iso-hexadecane (obtainable by hydrogenating tetra iso-butylene) was passed a gaseous mixture of 794 parts of sulphur dioxide and 287 parts of chlorine. The reaction was catalyzed, or accelerated, by an electric light suspended beside the reaction flask. The temperature of the reacting oil was kept at 45–50° C. The mixture of gases was passed at a uniform rate over a period of four hours. At the end of this time the original oil had increased 150 parts by weight. The reaction mixture was then poured into 400 parts of hot 30% sodium hydroxide, being thus hydrolyzed and neutralized. The hydrolysis was carried out at a temperature of 90–95° C. The crude product was purified by diluting with an equal volume of water whereupon an oily layer separated on top. The lower aqueous layer was drawn off and further oil removed by extraction with carbon tetrachloride. After heating to remove traces of solvent the aqueous solution showed good wetting properties. By the Draves-Clarkson sinking method a solution of 0.9 g. per liter of water gave sinking of cotton skeins in 25 seconds.

Example II

Into 228 g. of iso-octane was passed a gaseous mixture of 1763 g. of sulphur dioxide and 660 g. of chlorine at a uniform rate over a period of four hours. The temperature of the reaction was kept at about 40° C. The reaction mixture gained 177 g. during this time. The reaction was accelerated by the light from a 60 watt electric light suspended beside the reaction flask. The reaction product was hydrolyzed by pouring into 511 g. of hot 30% sodium hydroxide. The heat of reaction raised the temperature to 90–95° C. where it was held during the hydrolysis. The product was tested as a mercerizing assistant and had an effect equal to that of "Alkanol"

M, which is a mixture of acids obtained by oxidizing the higher boiling alcohols obtained by hydrogenating carbon monoxide.

*Example III*

Into 300 g. of iso-decane (obtainable by hydrogenating di-isoamylene) was passed a gaseous mixture of 1077 g. of sulphur dioxide and 463 g. of chlorine at a uniform rate over a period of 5½ hours. The temperature was kept at 45-50° C. The reaction was accelerated by the light from an electric light suspended beside the reaction flask. The gain in weight was 266 g. The reaction mixture was hydrolyzed by pouring into 580 g. of hot 30% sodium hydroxide. The crude product was purified by diluting with an equal volume of water, separating the resulting top oily layer, and extracting the aqueous layer with petroleum ether to take out the remainder of the insoluble oil. The resulting product was an excellent mercerizing assistant. Laboratory tests showed it to be superior to "Alkanol" M as a wetting agent in 52° Twaddell caustic soda solution.

By similar means iso-pentadecane (made by hydrogenating tri-isoamylene), iso-dodecane (made by hydrogenating tri-isobutylene), iso-octane (made by hydrogenating di-isobutylene), and mixtures of iso-alkanes obtained by refining the lower-boiling petroleum distillates, may be made water-soluble. These lower boiling petroleum iso-alkanes occur richly in the so-called cracked and polymerized gasolines where a large proportion of branched chain paraffin hydrocarbons are formed by cracking the straight chain hydrocarbons and then polymerizing them to higher molecular weight branched chain paraffins. The products obtainable from these compounds and mixtures thereof exhibit surface active properties which make them valuable textile auxiliaries.

Likewise, hydrogenated polymerized bodies obtained from hexene-3 such as iso-dodecane (made by hydrogenating dihexene), iso-octadecane (made by hydrogenating tri-hexene), and other synthetic branched chain paraffins made by hydrogenating polymerized olefines or acetlyenes may be made water soluble in a manner similar to that disclosed in the above examples to make surface active compounds. Also, the hydrocarbons formed by the hydrogenation of carbon monoxide which are predominantly branched chain paraffin hydrocarbons may be utilized as a source of starting material for our products.

Other branched chain hydrocarbons which may be treated by our method to produce valuable surface active materials may be obtained by known methods, such as dehydration followed by subsequent hydrogenation, direct hydrogenation, or decarbonylation, from compounds such as: 2-ethyl hexanol-1; 2:6-dimethyl heptene-2-ol-6; 2:6 dimethyl octene-2-ol-8; 4-methyl heptanol-1; 2-n butyl octanol-1; 2 methyl tridecanol-2; 7-ethyl-2-methyl undecanol-4; 5-ethyl nonanol-2; 5,11-diethyl pentadecanol-8; 3-ethyl heptanol-6; 3,9-diethyl undecanol-6; 3-ethyl undecanol-6; 3-ethyl-8-methyl nonanol-6; 3,9-diethyl tridecanol-6; 6-ethyl decanol-3; 2-methyl nonanol-4; 9-ethyl tridecanol-6; 5,7 diethyl undecanol-4; 9-ethyl-5-methyl tridecanol-6; 3-ethyl undecanol-6; 3-methyl heptanol-2; 5-ethyl tridecanol-8; 5-methyl-1-cyclohexyl hexanol-3; 4, 9, 12-trimethyl pentadecanol-7; 3, 8, 11 trimethyl tridecanol-6; 8-methyl tridecanol-6; 2, 7, 10-trimethyl undecanol-5; 2, 4, 9, 12, 14-pentamethyl pentadecanol-7; 5, 13-diethyl-10-methyl heptadecanol-8; 2, 4, 6, 9, 10, 12, 14 heptamethyl pentadecanol-7; 2-n-hexyl decanol-1.

The invention is not to be limited by the conditions set forth in the above examples as conditions may be varied without departing from the scope of the invention. For example, the ratio of sulphur dioxide may be varied from 1 mol of sulphur dioxide to 1 mol of chlorine, to 20 mols of sulphur dioxide to 1 mol of chlorine. It is preferably operated with 2 to 6 mols of sulphur dioxide to 1 mol of chlorine, and more particularly with 2.5 to 3.5 mols of sulphur dioxide to 1 mol of chlorine. The temperature of the oil being treated may be varied from room temperature to the boiling point of the hydrocarbon, or to the decomposition point of the hydrocarbon sulphonyl chlorides formed, but I have found it preferable to operate between 30° and 80° C. and more particularly at 45-50° C.

Light accelerates the rate of the reaction and it is preferable to illuminate the reaction mass with a suitable light such as an electric light, carbon arcs, including metal cored and metal salt cored carbon arcs, or the light from an ionized vapor such as a mercury vapor lamp or rare gas lamp although the reaction will take place in the dark.

The gases may be dispersed within the liquid in any convenient way such as passing them through a porous plate, fritted glass discs, or simply by mechanical agitation, or other means. Generally, I prefer to use the conditions as set forth in the examples since by trial and error I have found that they give the fastest time of reaction, the most complete reaction, and the product with the best physical appearance.

Instead of a closed vessel provided with a reflux condenser, one may use a long narrow tube. The tube may be partially filled with an iso-alkane and chlorine and sulphur dioxide may be bubbled into the bottom thereof. A countercurrent apparatus in which an iso-alkane flowing in one direction through a tube is caused to react with a gaseous chlorine and sulphur dioxide mixture flowing in the opposite direction, after the manner described and claimed in an application of W. H. Lockwood and J. L. Richmond, Serial No. 216,843, entitled Continuous process, filed upon an even date herewith, may be resorted to. The reaction tubes can be packed with any device suitable for carrying out the reaction of a liquid with a gas, e. g., Raschig rings, broken glass, etc.

The reaction zone may be maintained at atmospheric pressure or below, but the reaction is preferably carried out at atmospheric pressure or any pressure above so long as the chlorine and sulphur dioxide remain gaseous at the reaction temperature.

The products may be purified by removing the insoluble and unreacted oil by dilution and separation of the oil layer, by extraction with oil-dissolving solvents, by steam distillation to remove the unreacted oil, etc. which are disclosed and claimed in an application for Letters Patent of C. F. Reed, C. O. Henke and A. L. Fox, Serial No. 216,842, entitled "Purification of chemical compositions" filed upon an even date herewith. The aqueous solution may be dried by evaporation, spray drying, drum drying, or other conventional means. By drum drying the above products white flaky or powdery products are obtained.

This invention is not to be limited to the hydrolysis procedure set forth in the examples. For instance, the concentration of caustic soda used for hydrolyzing the reaction product obtained by treating an isoalkane with a gaseous mixture of sulphur dioxide and chlorine may be varied from 5% to 50%. The reaction is somewhat slower with the more dilute caustic soda solutions and almost instantaneous with the more concentrated solutions. Other alkali metal hydroxides such as potassium, caesium, etc. may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, α-naphthyl amine, etc. Thus, the amine salts of chlor-iso-alkane sulphonic acids may be obtained. Also, the strong quaternary ammonium bases such as tetra-methyl-ammonium-hydroxide and tetraethyl-ammonium-hydroxide may be used for the hydrolysis. The resulting products would be the tetra-methyl-ammonium salt or the tetraethyl-ammonium salt of chlor-iso-alkane sulphonic acids. The preferred salt for use in mercerizing liquors is, of course, the sodium salt. For use in acid or salt solutions one of the amine or quaternary ammonium salts may be more desirable as possessing greater solubility.

Water miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol, and its ethers and esters, e. g. ethylene glycol, diethyl ether, dimethyl ether, etc.

The products prepared according to this invention serve as intermediates for the preparation of numerous derivatives such as, for example, iso-alkane sulphonic acids and salts thereof, sulphinic acids, amides, sulphonyl esters, mercaptans, etc., which may be useful as mercerizing assistants, plasticizers for paints, nitro cellulose lacquers, varnishes, Cellophane, etc., corrosion inhibitors, gum solvents for gasoline, extractants for the refining of oils and gasoline, pour point depressants, insecticides, fly spray ingredients, weed killers, soil fumigants, cotton immunization chemicals, anti-shrinking agents for wool, foaming agents, mold inhibitors, creaseproofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing pastes, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, shampoos, dentifrices, washing of paper mill felts, etc. They may also be used to improve fat liquoring and leather treatment processes as well as for fat splitting agents. They may be useful in improving the preservation of green fodder. They may also be useful in improving the removal of fibrous layers from surfaces and in metal cleaning. They may also be used to improve flotation processes of ores, pigments, coal, etc. They may be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may be useful in storage batteries and dry cells. Other uses for these products or their derivatives are as fungicides, accelerators, delusterants, extreme pressure lubricants, mothproofing agents, antiseptics, fire-proofing agents, mildew preventers, penetrating agents, anti-flexing agents, tanning agents, lathering agents, dust collecting agents, antioxidant, color stabilizer in gasoline, etc.

The surface activity of some of the agents may be enhanced by electrolytes or by the addition of other surface-active agents, e. g., alkylated naphthalene sulphonic acids and their water-soluble salts, salts of higher alkyl sulphuric acid esters as described in Bertsch Patents Nos. 1,968,794 to 1,968,797, long chain betaine derivatives both of the C- and N- and open type which are illustrated by Daimler et al. Patent No. 2,082,275, Balle et al. Patent 2,087,565, Platz et al. Patent 2,097,864, and Balle et al. Patent 2,101,524, long chain ammonium, sulphonium and phosphonium compounds, as well as numerous other soap substitutes.

The hydrolysis products or water-soluble salts of the above-described sulphonyl chlorides which have surface active properties may be used in admixture with one another and/or in admixture with soap and/or soap substitutes of the prior art, for various purposes wherein soap and/or soap substitutes have previously been used or are capable of use. A few representative uses are set forth in Reed application, Serial No. 216,332 entitled "Chemistry", filed on June 28, 1938, and it is to be understood that the products produced according to this invention may be substituted in like amount for the products of each of the examples of that case.

As many apparently widely different embodiments of this invention may be made without departing from the spirit and scope thereof, it is to be understood that I do not limit myself to the specific embodiments thereof except as defined in the appended claims.

I claim:

1. The process which comprises reacting a normally non-gaseous branched chain saturated aliphatic hydrocarbon with a gaseous mixture of sulphur dioxide and chlorine.

2. The process which comprises reacting a mixture of normally non-gaseous branched chain saturated aliphatic hydrocarbons with a gaseous mixture of sulphur dioxide and chlorine.

3. The process which comprises reacting a normally non-gaseous iso-alkane with a gaseous mixture of sulphur dioxide and chlorine at a temperature below about 150° C.

4. The process which comprises reacting a liquid iso-alkane with a gaseous mixture of sulphur dioxide and chlorine in the presence of actinic light.

5. The process which comprises reacting a liquid iso-alkane with a gaseous mixture of sulphur dioxide and chlorine in which the former is in excess at a temperature from about 0° C. to the boiling point of the hydrocarbon and in the presence of actinic light.

6. The process which comprises reacting a liquid iso-alkane with a gaseous mixture of from 1 to 20 mols of sulphur dioxide to 1 mol of chlorine at a temperature between 30° C. and 65° C. in the presence of actinic light.

7. The process which comprises reacting a liquid iso-alkane with a gaseous mixture of from 1 to 6 mols of sulphur dioxide to 1 mol of chlorine at a temperature between 30° C. and 65° C. in the presence of actinic light.

8. The process which comprises reacting a normally non-gaseous branched chain saturated aliphatic hydrocarbon with a gaseous mixture of sulphur dioxide and chlorine, and hydrolyzing the product.

9. The process which comprises reacting a normally non-gaseous branched chain saturated aliphatic hydrocarbon with a gaseous mixture of sulphur dioxide and chlorine, and hydrolyzing and neutralizing the resulting product.

10. The process which comprises reacting a liquid iso-alkane with a gaseous mixture of sulphur dioxide and chlorine in which the former is in excess at a temperature from about 0° C. to the boiling point of the hydrocarbon and in the presence of actinic light, and hydrolyzing the product with a base.

11. The process which comprises reacting a liquid iso-alkane with a gaseous mixture of sulphur dioxide and chlorine in which the former is in excess at a temperature from about 0° C. to the boiling point of the hydrocarbon and in the presence of actinic light, and hydrolyzing and neutralizing the product with an alkali metal base.

12. The process which comprises reacting a liquid iso-alkane with a gaseous mixture of from 1 to 5 mols of sulphur dioxide to 1 mol of chlorine at a temperature between 30° C. and 65° C. in the presence of actinic light, and hydrolyzing the product with a caustic soda solution.

13. A solution of electrolytes containing the product of claim 8.

14. The mixture of hydrocarbon sulphonyl chlorides produced by the process of claim 1.

15. The mixture of hydrolyzed and neutralized hydrocarbon sulphonyl chlorides produced by the process of claim 17.

16. The mixture of hydrocarbon sulphonyl chlorides produced by the process of claim 7.

17. The process which comprises reacting a non-gaseous iso-alkane in the liquid phase with admixed gaseous chlorine and gaseous sulphur dioxide at a temperature between about 0° C. to the boiling point of the hydrocarbon, and hydrolyzing and neutralizing the same with an alkali metal base.

ARTHUR L. FOX.